INVENTOR
Talmadge D. Skelton

BY John A. Mackinney
ATTORNEY

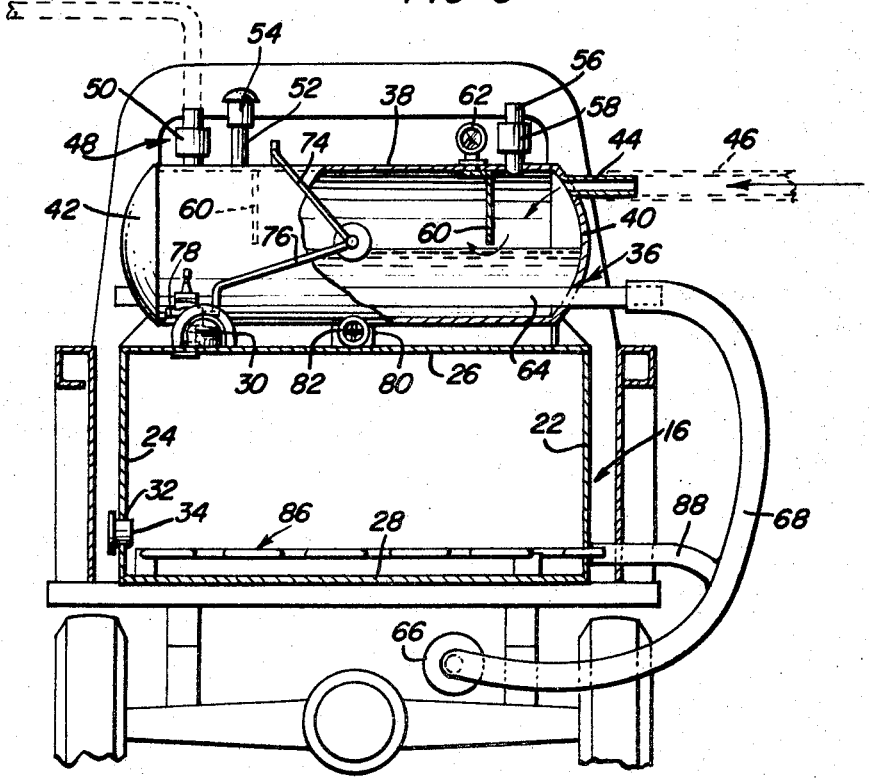

United States Patent Office 3,435,595
Patented Apr. 1, 1969

3,435,595
APPARATUS FOR RECLAIMING PARAFFIN AND OTHER LIQUIDS FROM A GAS FLOW LINE
Talmadge D. Skelton, Hobbs, N. Mex., assignor to The Skelton Corporation, Hobbs, N. Mex.
Filed Sept. 8, 1967, Ser. No. 666,410
Int. Cl. B01d 19/00
U.S. Cl. 55—169    1 Claim

ABSTRACT OF THE DISCLOSURE

A pair of first and second tanks with the first tank including inlet means adapted to have the outlet end of a gas conduit from a well, through which heavy paraffin and lighter hydrocarbons also flow, secured thereto and also a gas outlet provided with means operable to maintain the first tank under a predetermined minimum pressure, the first tank including means operative to cause most liquids, semi-solids and solids contained in the flow of gas to precipitate to the bottom of the first tank as the flow from, an associate well passes through the first tank and selectively actuatable discharge means operable to discharge precipitate from the lower portion of the first tank into the second tank in response to a rise in the level of precipitate in the first tank.

---

The paraffin reclaim unit is intended to provide a means whereby heavy paraffin and other liquids may be separated from gas flowing from a well. The reclaim unit includes a first tank into which the gas and heavy paraffin as well as other liquids are introduced and a gas outlet provided with valve means for maintaining the interior of the tank under a minimum predetermined pressure. Means operative to cause the paraffin and other liquids to precipitate to the bottom of the first tank as the gas flows through the first tank is provided and the first tank is operatively communicated with a second tank by discharge means operable to automatically discharge the precipitate from the first tank into the second tank in response to a rise of the precipitate in the first tank to a predetermined level, the first and second tanks being provided with heating means in their lower portions for maintaining the precipitated fluids in a fluid state.

The entire reclaim unit is mounted on a vehicle and the gas flowing from the gas outlet of the first tank may be conveyed to a tank battery for collection or vented to the ambient atmosphere, depending upon the wishes of the lease operator. After the second tank has been substantially filled with fluid which has been precipitated out of the gas flow through the first tank, the unit may be readily transported to a suitable location by the truck on which the unit is mounted in order that the precipitated fluids in the second tank may be processed as desired.

In the past, the flow of gas, from which the unit of the instant invention is adapted to precipitate the paraffin and other liquids, has been vented to the ambient atmosphere and burned at a considerable waste of the paraffin and other liquids which may be processed into useful products.

Accordingly, it is the main object of this invention to provide a reclaim unit whereby paraffin and other liquid in a gas flow from a well may be reclaimed for future processing into useful products.

Another object of this invention, in accordance with the immediately preceding object, is to provide a reclaim unit which may be readily transported from a position adjacent a well to a suitable collection point for the precipitates reclaimed by the unit such as a processing point for the precipitates.

Still another object of this invention is to provide a reclaim unit provided with suitable safety features whereby surges in pressure of the gas flowing from the associate well may be immediately vented.

Another object of this invention is that other means of heat can be used, as well as the means we are now using.

A final object of this invention to be specifically enumerated herein is to provide a reclaim unit in accordance with the preceding objects and which will conform to conventional forms of manufacture, be of simple construction and easy to operate so as to provide a device that will be economically feasible, long lasting and relatively trouble-free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1:
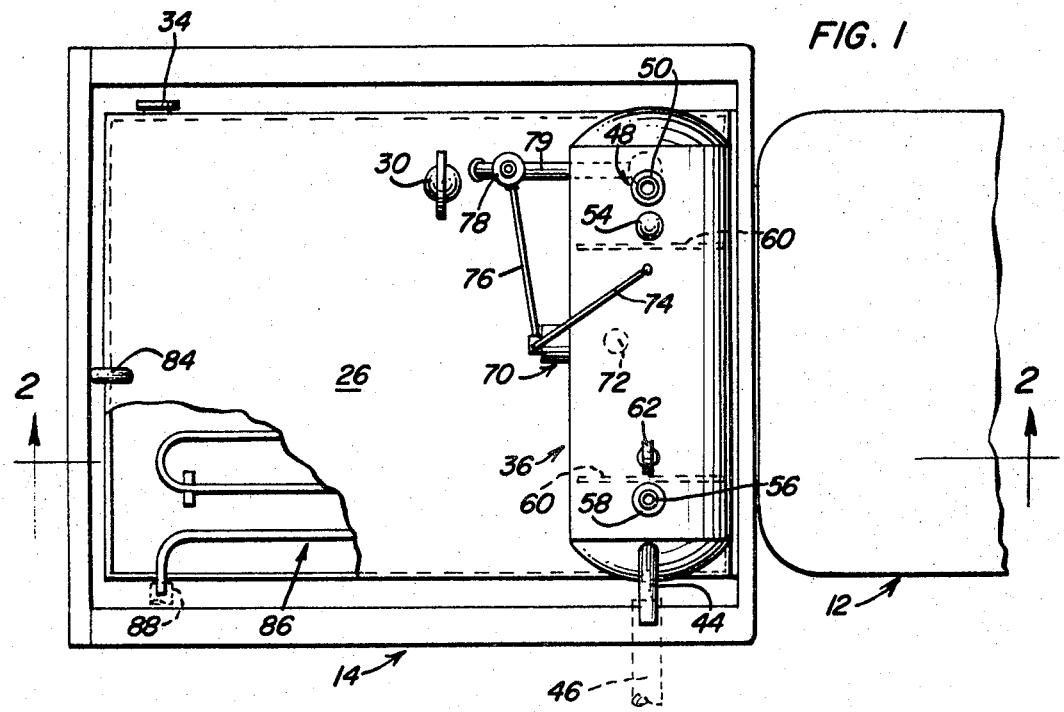
FIGURE 1 is a top plan view of the reclaim unit of the instant invention illustrated mounted upon a truck vehicle and with portions of the truck and reclaim unit being broken away.
Figure 2:
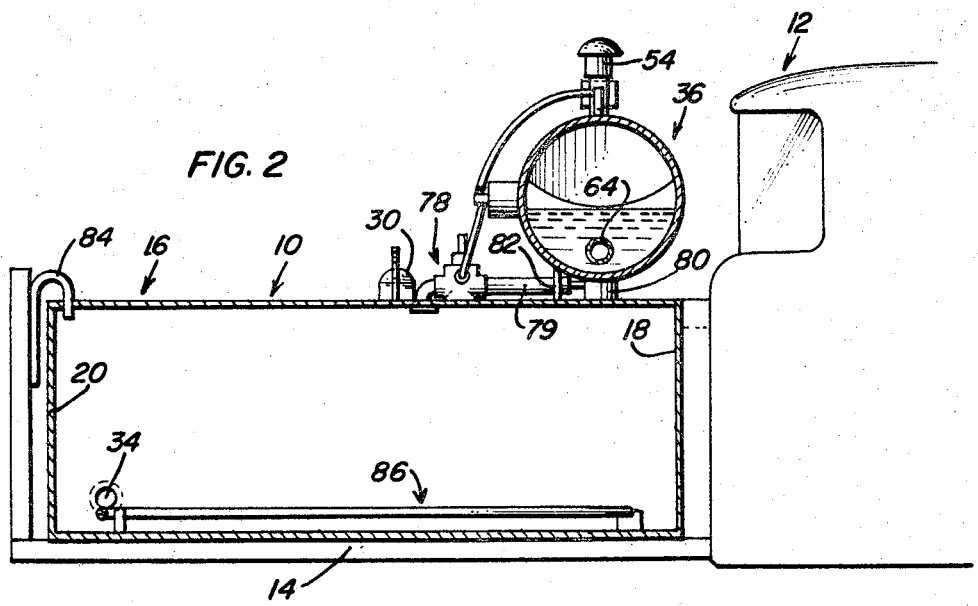
FIGURE 2 is a vertical sectional view taken substantially upon the plane indicated by the section line 2—2 of FIGURE 1.

FIGURE 3 is a transverse vertical sectional view taken substantially upon a vertical plane passing through the center of the lower tank of the unit with portions of the upper tank being broken away and also illustrated in vertical section; and FIGURE 4 is an enlarged fragmentary elevational view of a dump valve assembly utilized to intermittently discharge material from the separator tank portion of the invention into the storage tank portion in response to changes in the level of liquid in the separator tank portion.

Referring now more specifically to the drawings, the numeral 10 generally designates the reclaim unit which is illustrated as being mounted upon a truck referred to in general by the reference numeral 12. The truck 12 includes a load bed 14 upon which the unit 10 is suitably disposed. The unit 10 includes a lower storage tank referred to in general by the reference numeral 16 and including opposite end walls 18 and 20, opposite side walls 22 and 24 and top and bottom walls 26 and 28. The storage tank 16 is closed to the ambient atmosphere although it is provided with a removable hatch closure 30 and a cleanout opening 32 which is closed by a removable plug 34.

A separator tank generally referred to by the reference numeral 36 is secured to and supported from the storage tank 16. The separator tank is in the form of generally cylindrical and horizontally disposed tank including cylindrical side wall portions 38 and outwardly convexed end wall portions 40 and 42. The separator tank 36 includes an inlet 44 for receiving paraffin and other liquids from a gas flow line 46 connected to the inlet 44 and the tank 36 also includes a gas outlet assembly 48 having a backpressure valve 50 operatively associated therewith. The valve 50 is provided to maintain a pressure of 15 to 30 pounds per square inch within the separator tank 36. Further, the tank 36 is also provided with a high pressure outlet 52 having a pop valve 54 operatively associated therewith which will open the pressure within the tank 36 reaching 125 pounds per square inch. Also, the tank 36 further includes a pressure surge outlet 56 having a safety valve 58 of the rupture disc-type operatively associated therewith. The safety valve 58 has a 158 pound per square inch rating.

The interior of the tank 36 includes a pair of half moon baffles 60 and the upper portion of the tank 36 includes a pressure gauge 62. Also, a heat exchange tube 64 extends through the bottom of the tank 36 and has the engine exhaust system 66 of the truck or vehicle 12 operatively communicated therewith by means of an exhaust hose 68 extending between the exhaust system 66 and the heat exchange pipe 64.

A liquid level control such as Model CMAQ–401 available from Instruments, Inc., Tulsa, Okla., generally referred to by the reference numeral 70 and including a liquid level sensing float 72 is provided. The control 70 is mounted on the exterior of the tank 36 and the float 72 is disposed inside the tank 36 for sensing the level of liquid therein. A pressure line 74 extends from the top of the tank 36 to the control 70 and a second pressure line 76 extends from the control 70 to a dump valve assembly generally referred to by the reference numeral 78, such as 125 lb. W.P. "G" Series available from Kimray, Inc., Oklahoma City, Okla. The assembly 78 is operable to discharge fluid from the bottom of the tank 36 into the tank 16 through the discharge line 79 in which the assembly 78 is disposed. The dump valve assembly 78 is pressure actuated and upon the control 70 sensing an increase in the fluid level in the tank 36 above a predetermined level, pressure from the top of the tank 36 is vented through the lines 74 and 76 to the dump valve 78 activating the latter to discharge fluid from the bottom of the tank 36 through line 79 into the tank 16 until the level of liquid drops below the predetermined level in tank 36, whereupon the control 70 terminates the venting action of pressure from tank 36 to assembly 78 and the dump valve again closes. Also, a large diameter drain pipe 80 communicates the bottom of the tank 36 with the top of the tank 16 and has a manually actuatable valve 82 disposed therein.

The tank 16 is vented to the ambient atmosphere through a vent 84 and has a heat exchanging tube assembly generally referred to by the reference numeral 86 disposed therein and which may also be suitably connected to the exhaust hose 68 by means of a branch hose 88.

Although the heat exchanger tube assembly 86 and the heat exchanger pipe 64 have been illustrated and described as being supplied with heat from the exhaust system 66, other heating means may be provided if desired. However, by connecting the heat exchange pipe 64 to the exhaust system 66 any paraffin disposed within the tank 36 during transit of the truck 12 from the well to a process point may be heated and melted during transit of the truck 12 and drained into the tank 16 after the vehicle 12 reaches the process point by opening the valve 82.

In operation, gas flowing into the tank 36 through the inlet 44 and containing paraffin and other liquids is forced to travel a tortuous path through the tank 36 by the baffles 60 and the liquid and paraffin in the gas flow are caused to precipitate to the bottom of the tank 36. Inasmuch as the heat exchange pipe 64 is provided, the precipitate may be heated so as to be maintained in a fluid state. Then, as the level of the liquid within the tank 36 rises to approximately one-half the vertical extent of the tank 36, the float 72 will actuate the control 70 so as to communicate the pressure actuated dump valve 78 with the gas pressure in the top of the tank 36. Actuation of the dump valve 78 will in turn cause the heated liquid in the bottom of the tank 36 to be discharged downwardly into the tank 16. Then, after the tank 16 has been at least substantially filled after repeated dumping of liquid from the tank 36 into the tank 16, the truck or vehicle 12 may be driven to a process point and the liquid within the tank 36 may be removed therefrom. Any unheated liquid remaining in the tank 36 at the time the vehicle 12 is being driven to the process point from the well may be heated to and maintained in a fluid state during transport of the vehicle 12 by means of exhaust gases from the exhaust system 66 being ducted through the heat exchange pipe 64.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for separating heavy paraffin and lighter hydrocarbons from gas under pressure flowing through a conduit from a well, said apparatus comprising a vehicle provided with a combustion engine for propelling said vehicle, a first closed upper receiving tank and a second lower storage tank supported on said vehicle with said lower tank disposed directly beneath and adjacent said upper tank, said upper tank being vented to the ambient atmosphere, said first tank including inlet means adapted to have the outlet end of said conduit secured thereto and gas outlet means in its upper portion, said first tank including means operative to act upon and cause most liquids, semi-solids and solids in a flow of gas through said first tank to said gas outlet means to precipitate to a lower portion of said first tank and precipitate outlet means opening outwardly from said lower portion of said upper tank into the upper portion of said lower storage tank, selectively actuatable discharge means operatively associated with said precipitate outlet means for discharging precipitate from the lower portion of said tank into said second tank, said gas outlet means including means operable to maintain said first tank under a predetermined minimum pressure above atmospheric pressure, pressure actuatable control means for said discharge means, and liquid level sensing means associated with said first tank and operable to automatically communicate said control means with the gas under pressure in said first tank above the liquid therein for actuation of said control means in response to a rise in the liquid level in said first tank to a predetermined level whereby said discharge means will be automatically actuated to discharge precipitate from the bottom portion of said first tank into said second tank in response to the level of fluid in said first tank being raised to said predetermined level, said combustion engine including an exhaust gas system, said exhaust gas system including conduit means extending through the lower portions of said tanks for ducting hot exhaust gases from said combustion engine through said tanks to heat and maintain the liquids in said tanks heated above the temperature below which some of the liquids in said tanks might tend to solidify.

References Cited

UNITED STATES PATENTS

| 2,664,170 | 12/1953 | Walker et al. | 55—174 |
| 2,685,938 | 8/1954 | Walker et al. | 55—174 |
| 3,087,291 | 4/1963 | Jackson et al. | 55—73 |
| 3,119,674 | 1/1964 | Glasgow et al. | 55—80 |
| 3,314,219 | 4/1967 | Griffin et al. | 55—169 |
| 3,331,188 | 7/1967 | Sinex | 55—174 |

REUBEN FRIEDMAN, *Primary Examiner.*

CHARLES N. HART, *Assistant Examiner.*

U.S. Cl. X.R.

48—190; 55—174; 62—12